United States Patent [19]
Dunn

[11] Patent Number: 5,467,085
[45] Date of Patent: Nov. 14, 1995

US005467085A

[54] DISPLAY FOR ELECTRONIC INDICATOR

[75] Inventor: William R. Dunn, Alpharetta, Ga.

[73] Assignee: Avionic Displays Corporation, Atlanta, Ga.

[21] Appl. No.: 973,990

[22] Filed: Nov. 10, 1992

[51] Int. Cl.⁶ .................................................. G01C 21/00
[52] U.S. Cl. ........................... 340/971; 345/87; 345/102; 359/83
[58] Field of Search ........................... 340/461, 971, 340/945, 974, 975; 345/87, 102; 359/83, 48, 49, 50

[56] References Cited

U.S. PATENT DOCUMENTS

| | | | |
|---|---|---|---|
| 3,521,227 | 7/1970 | Congleton et al. | 340/975 |
| 4,365,869 | 12/1982 | Hareng et al. | 345/87 |
| 4,532,513 | 7/1985 | Halvorson | 340/971 |
| 4,687,072 | 8/1987 | Komuro | 345/87 |
| 4,798,426 | 1/1989 | Malcolm et al. | 350/3.7 |
| 4,980,683 | 12/1990 | O'Sullivan et al. | 340/961 |
| 4,988,995 | 1/1991 | Buisson et al. | 340/971 |
| 5,037,166 | 8/1991 | Malcolm et al. | 359/15 |
| 5,121,233 | 6/1992 | Spencer et al. | 359/48 |
| 5,164,849 | 11/1992 | Evans et al. | 345/102 |

*Primary Examiner*—Brent Swarthout
*Attorney, Agent, or Firm*—Standley & Gilcrest

[57] ABSTRACT

The invention describes a liquid crystal display having an enlarged viewing area by moving the liquid crystal glass from the chassis portion of the assembly to the bezel portion of the assembly. In one preferred embodiment the viewing area of a horizontal situation indicator on an aircraft instrument panel may be increased by fifty percent or more.

9 Claims, 7 Drawing Sheets

DISPLAY FOR ELECTRONIC INDICATOR

BACKGROUND AND SUMMARY OF THE INVENTION

The present invention relates generally to electronic display indicators, and more particularly, to an electronic liquid crystal display indicator having an enlarged display screen viewing area.

One example of such displays are electronic flight indicators which are required on most aircraft, to inform the pilot and, if applicable the copilot of the aircraft, of various information to assist in flying the aircraft. Military aircraft, commercial aircraft and even personally owned airplanes include electronic flight indicators in the instrument panels of the aircraft. Two common electronic flight indicators are: a horizontal situation indicator ("HSI"); and, an attitude direction indicator ("ADI"). For many years HSI and ADI consisted of electro-mechanical devices which used several internal gears powered by an electric motor(s) to drive the displays seen on the screen. These devices have been known to be prone to failure after just a few hundred hours of operation. A need exists for a more reliable design for electronic flight indicators.

Most military and commercial aircraft of today have a standard aircraft instrument panel dimension for each flight instrument. This is sometimes referred to as an ARINC cutout. In other words, the ARINC cutout for an ADI or HSI has already been predetermined by industry standards. Thus the dimensions of an ADI or HSI cannot exceed preexisting space limitations on the aircraft instrument panel. Prior to the present invention it was thought that the display screen of an HSI or ADI was fixed in size at approximately 3.4 inches×2.8 inches, since this has been substantially the maximum area for the screen display to occupy in the standard ARINC cutout for ADI and HSI. Due to the importance of making an ADI or HSI easily visible to a pilot or copilot it is advantageous to increase the size of the screen display. Prior to the present invention this was thought to be unachievable due to the space limitations established by the standard ARINC cutout dimensions on an aircraft instrument panel. In one preferred embodiment of the present invention a 60 percent increase in the screen display viewing area of an ADI or HSI is achieved, while maintaining the same body or chassis dimension of known ADI or HSI to reside within a standard ARINC cutout. The increased viewing area can also enable other flight indicators to be displayed on an HSI or ADI display glass.

The ADI and HSI of the present invention incorporate liquid crystal display (LCD) technology, known to those of ordinary skill in the art, to produce the visible display on an ADI or HSI. This particular technology, which may be an active matrix liquid crystal display (AMLCD) consists of a series of rows and columns of red, green, and blue dot transistors sandwiched between two glass panels. A liquid crystal fluid is activated by a voltage which changes the plane of polarization causing the dot transistors to emit light in the colors of red, green or blue or a mixture thereof. There can be several hundred columns of dots going across the display as well as hundreds of vertical rows of dots which can result in over one hundred thousand individual transistor switch dot triplets of red, green and blue. The liquid crystal display is driven by electronics contained within the body or chassis of the ADI or HSI assemblies.

The present invention provides a new and enlarged viewing display on an electronic flight indicator to be installed in a standard ARINC cutout on an aircraft instrument panel. The electronic flight indicator includes a body or chassis portion, a front mounting flange, and a bezel assembly on the face of the flight indicator. The present invention places the display screen into the front mounting flange and the bezel which reside just outside (the cockpit side) of the standard ARINC cutout on the instrument panel. By moving the display screen to the front flange an increased viewing area can be obtained.

The present inventor had to overcome certain obstacles to obtain a working display in the front flange of the flight indicator assembly. First, to provide light to the entire viewing area on the screen it became necessary to move the backlight, which prior to the present invention existed in the body or chassis of the flight indicator, to a position immediately adjacent to the rear of the bezel and just behind the display screen. Second, a display interface was needed to make contact with the glass, now moved to the front mounting flange. The display interface enables the dot transistors to receive electronic signals from the interface electronics in the chassis which have processed signals from various aircraft sensors.

It is recognized that the present invention is useful in other display indicators besides those found in aircraft. Similar indicators may be found in submarines, tanks, ships, and other vehicles. The present invention will be better understood from the following description of the drawings and detailed description of the preferred embodiments.

DETAILED DESCRIPTION OF PREFERRED EMBODIMENT(S)

Figure 1:
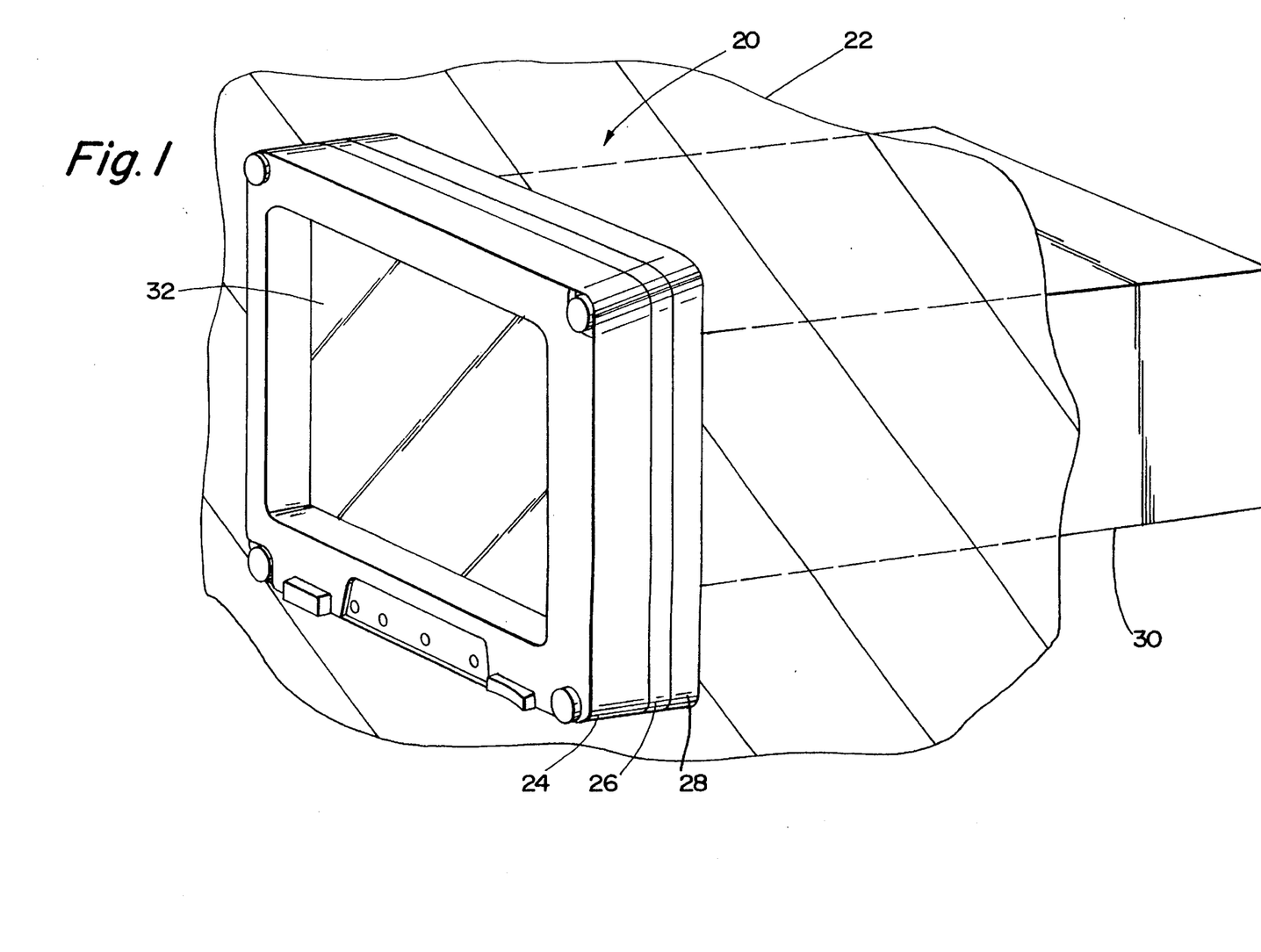
FIG. 1 is a side view of an electronic flight indicator of a type that could incorporate the present invention.

Referring now to the drawings, and particularly FIG. 1, there is shown a typical electronic flight indicator (20) as it resides in an aircraft instrument panel (22). The indicator (20) includes a bezel (24), a mounting flange (26), an adapter plate (28), and a chassis (30), which houses the electronic components and circuitry that receives signals from various devices in the aircraft, processes those signals, and produces a display on the viewing screen (32) visible through the opening in the bezel (24). The bezel (24) resides on the side of the instrument panel (22) closest to the pilot. The chassis (30) resides substantially on the side of the instrument panel opposite the cockpit and in the direction of the nose of the aircraft. The manner in which the electronic flight indicator (20) receives signals from the aircraft and processes those signals to produce a display is known to those of ordinary skill in the art. In one preferred embodiment of the present invention, the display is an active matrix liquid crystal display which may be a horizontal situation indicator or an attitude direction indicator.

Figures 2, 3:
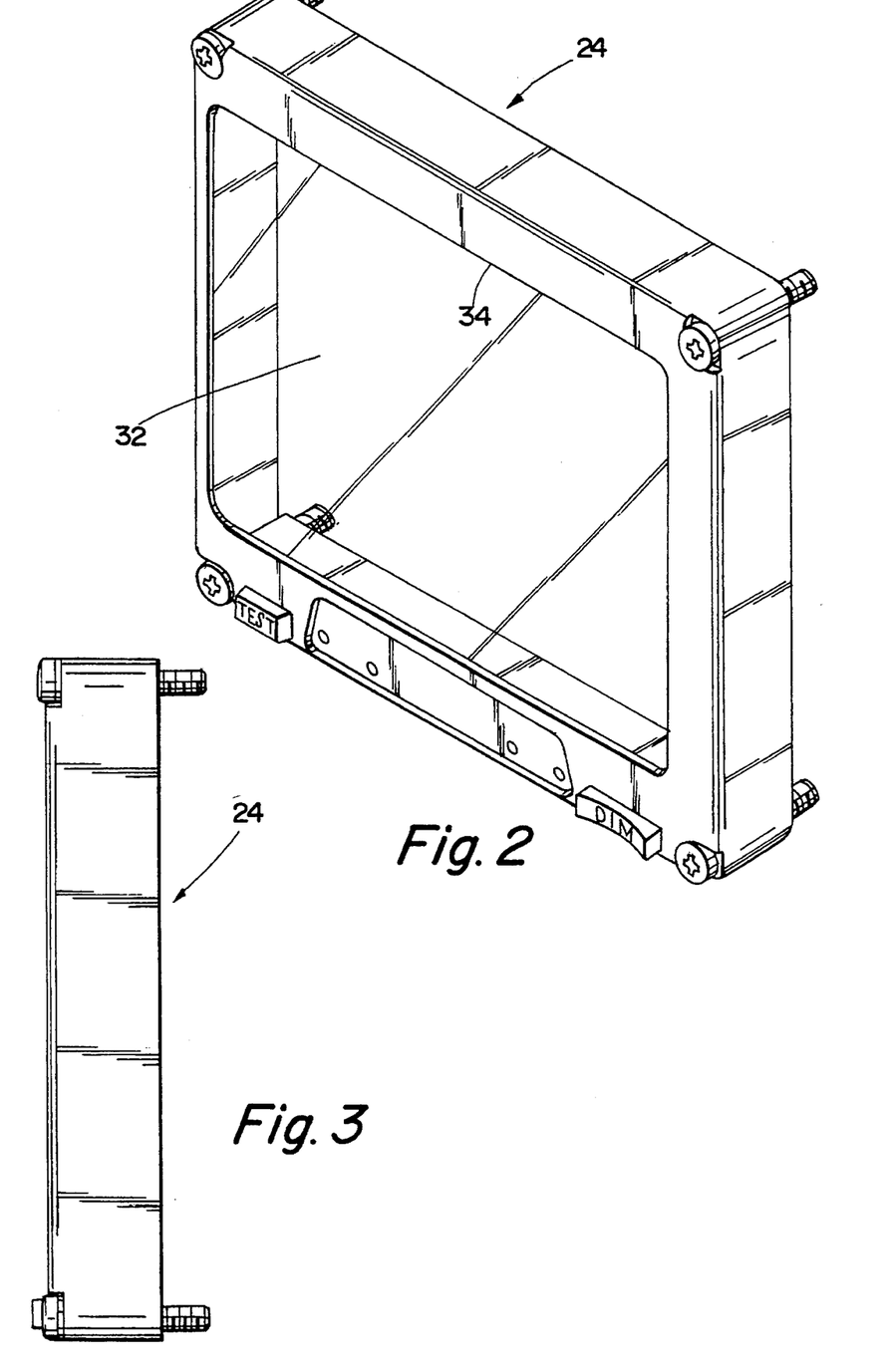
FIG. 2 is a perspective view of an operator bezel for use with the present invention.
FIG. 3 is a side view of the bezel of FIG. 2.

FIG. 2 is a perspective view of the bezel (24) having an opening (34) for viewing a display produced on liquid crystal display glass (32). FIG. 3 shows a side view of the bezel.

Figure 4:
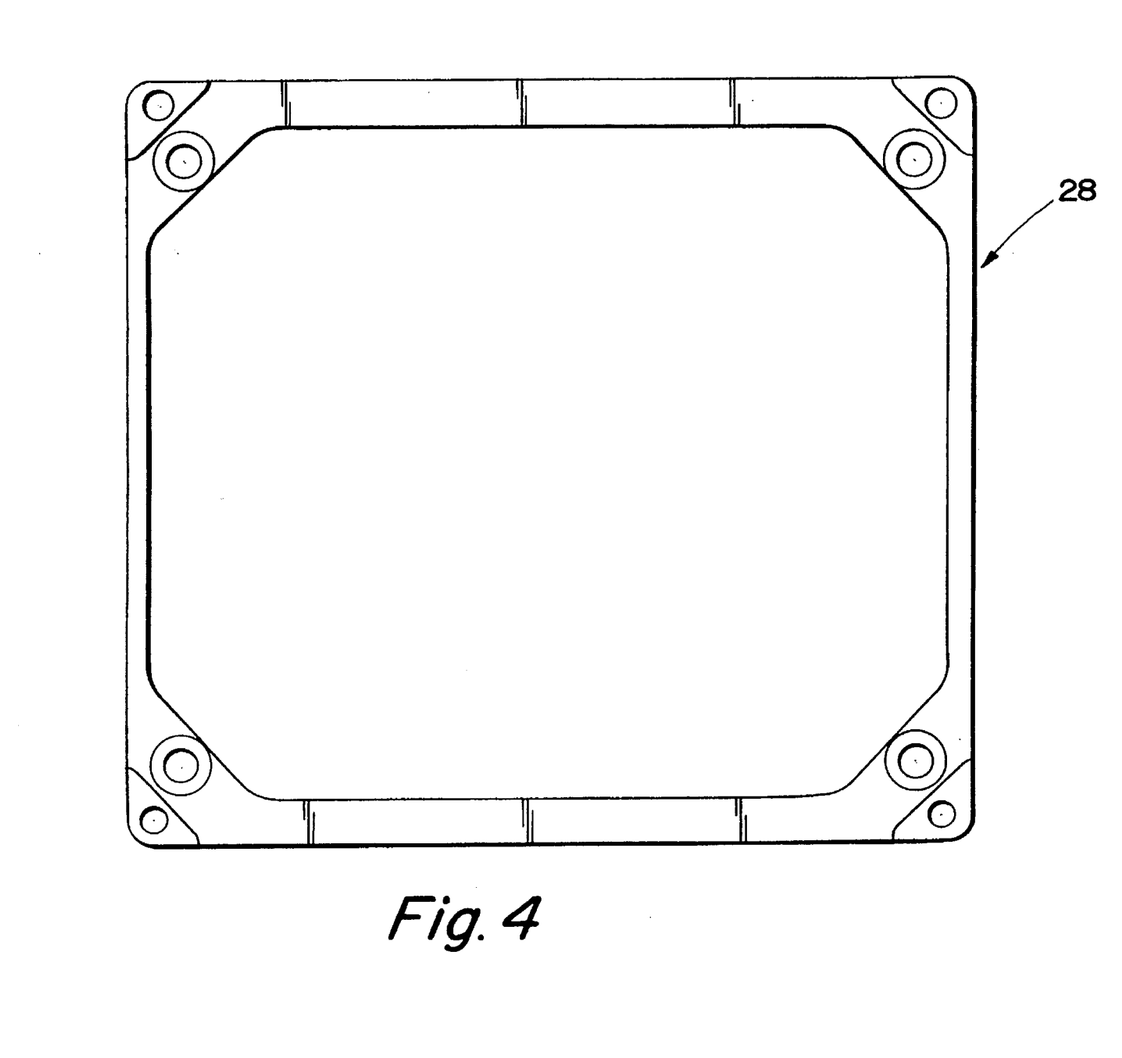
FIG. 4 is a plan view of an adapter plate for use with the present invention.
Figure 5:
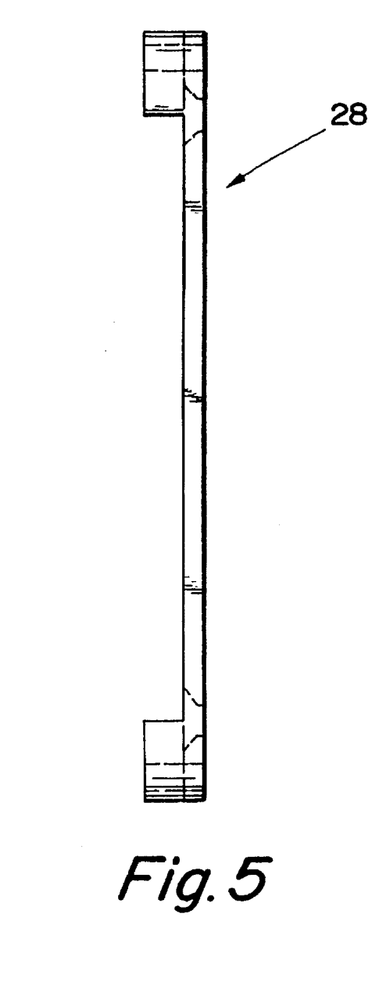
FIG. 5 is a side elevational view of the adapter plate of FIG. 4.

FIG. 4 shows a plan view of an adapter plate (28) for use with the present invention. As previously discussed, an aircraft instrument panel (22) has standard ARINC cutouts for various electronic flight indicators. These cutouts are generally of a different set of dimensions for different types of indicators. The adapter plate shown in FIG. 4 and in FIG. 5 as a side view, may be secured to the instrument panel with an opening (29) corresponding to the standard ARINC cutout of that particular indicator and having means for retaining other portions of the indicator assembly.

Figure 6:
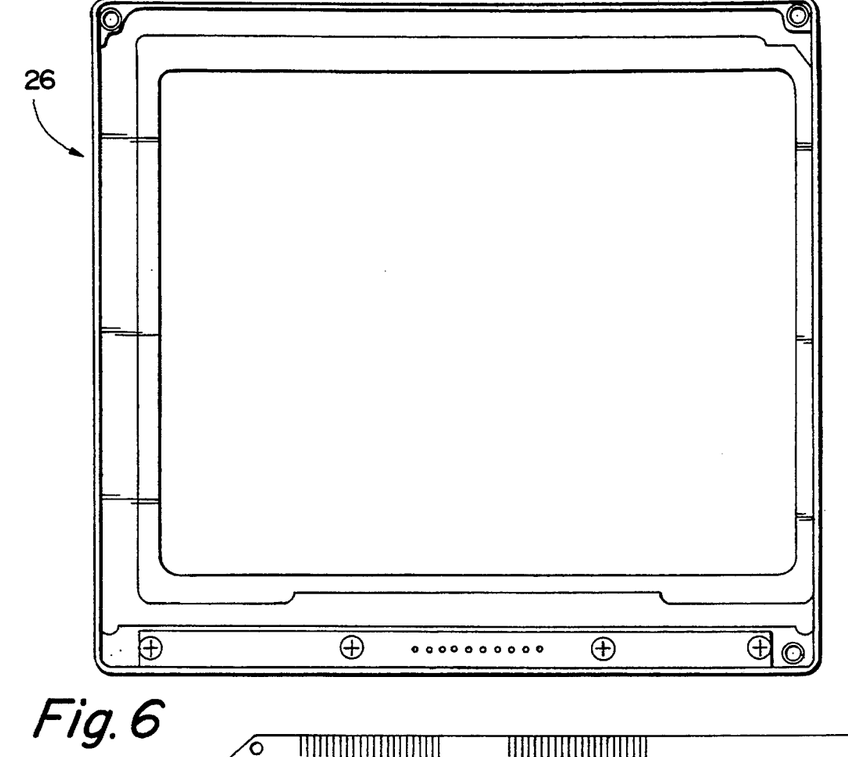
FIG. 6 is a display side, plan view of a mounting flange for use with the present invention.
Figure 11:
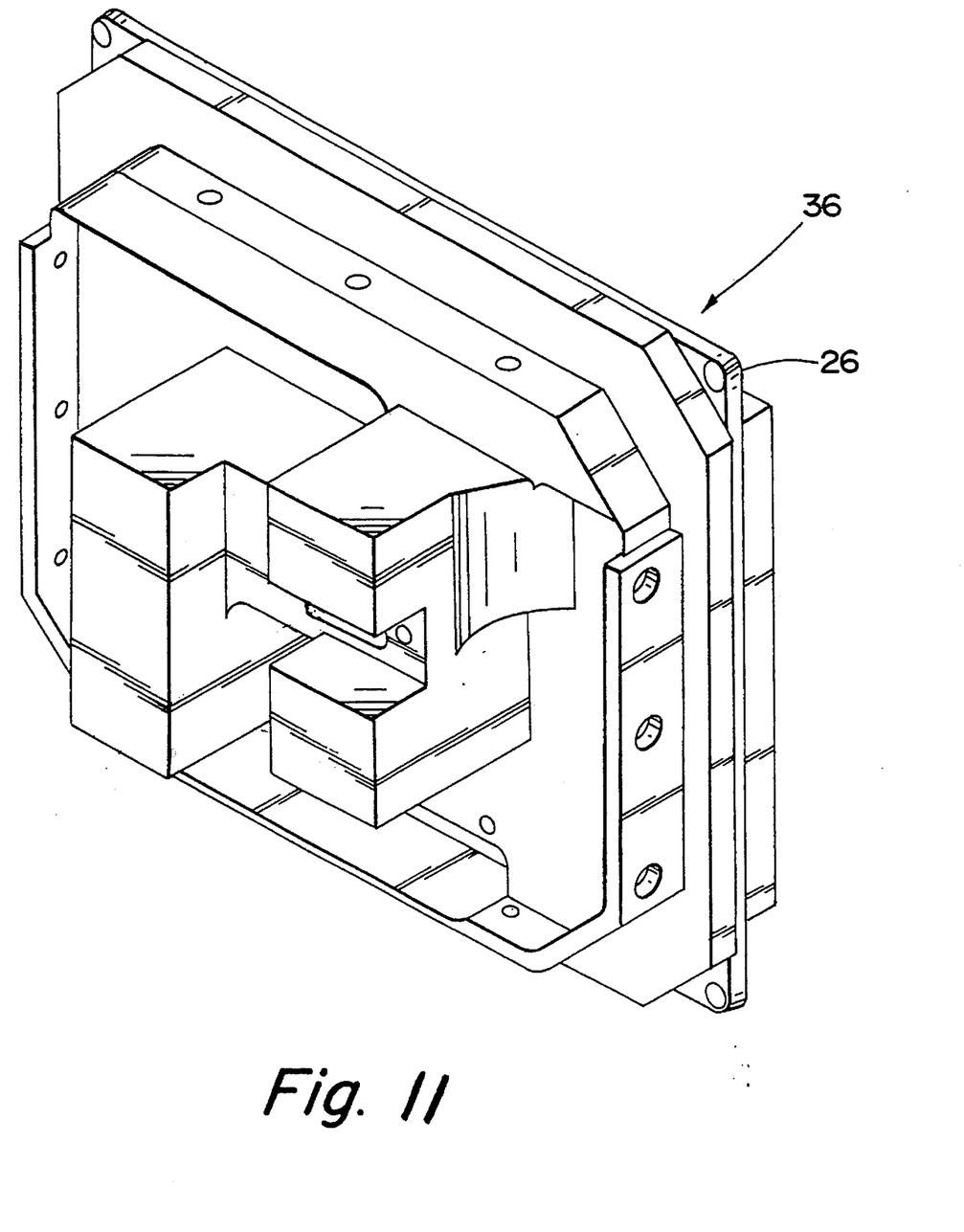
FIG. 11 is a chassis side, perspective view of a lamp module of the present invention.
Figure 12:
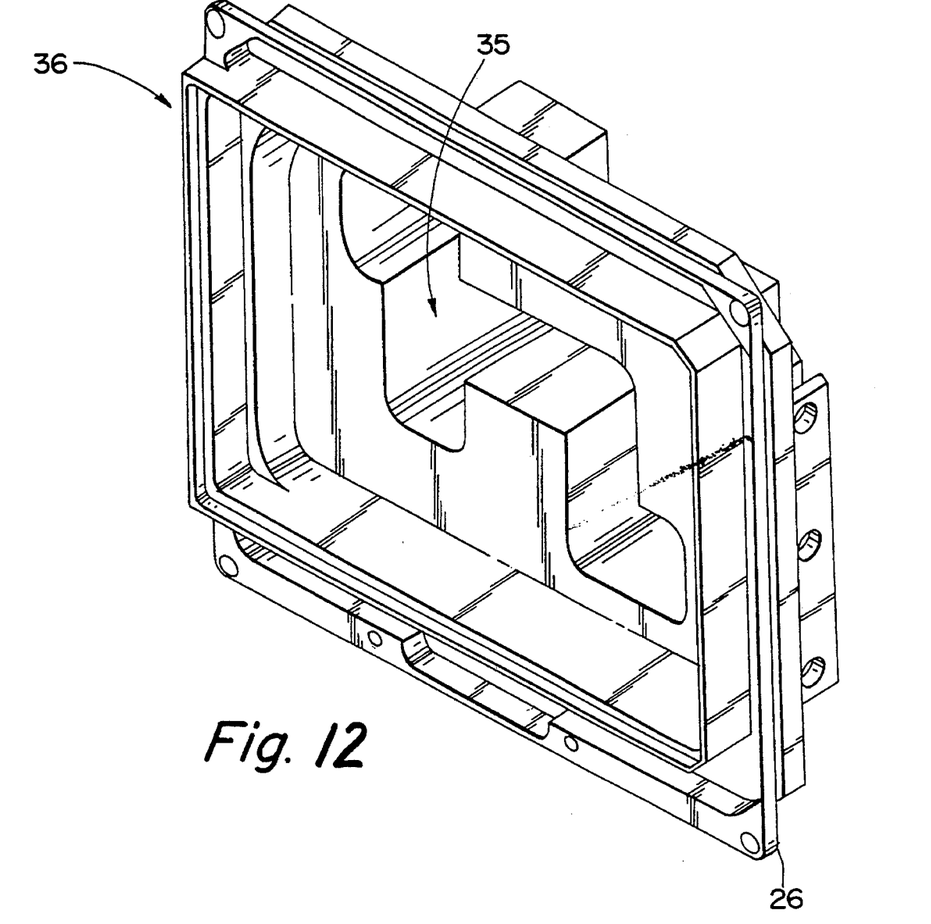
FIG. 12 is a display side, perspective view of the lamp module of FIG. 11.
Figure 13:
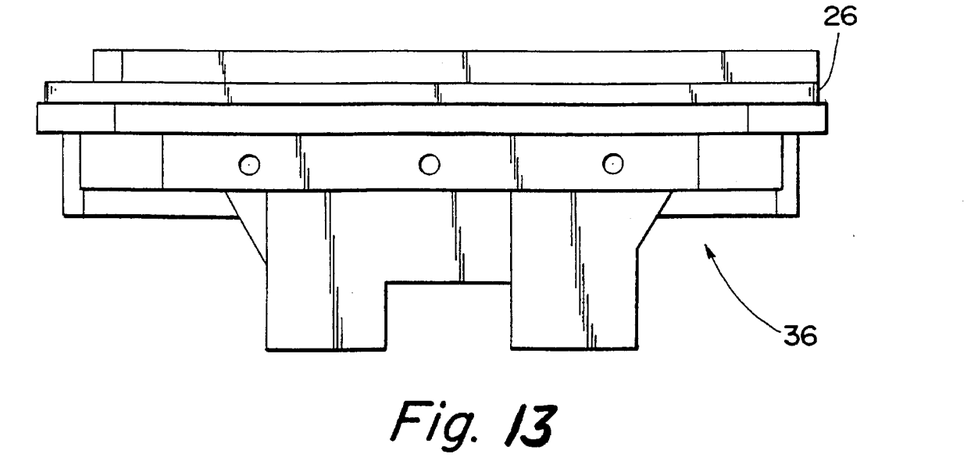
FIG. 13 is a view looking down onto the top side of the lamp module of FIG. 11.

FIGS. 11 and 12 show opposite sides of a lamp module (36) of the present invention. Within cavities (35) of the lamp module (36) resides lighting means, known to those of ordinary skill in the art, to provide a backlight for the liquid crystal display (32). Forming an integral part of the lamp module (36) is the mounting flange (26) which is shown in FIG. 6. In this embodiment the mounting flange is a part of the lamp module, however, it should be recognized that the mounting flange may be a separate part from the lamp module. FIG. 13 is a view looking down onto the top side of the lamp module (36). It should also be recognized that the lamp module is merely a preferred manner of backlighting the liquid crystal display and should not be construed as limiting. Other lighting means known to those of ordinary skill in the art would serve the same function in an appropriate application.

Figure 7:
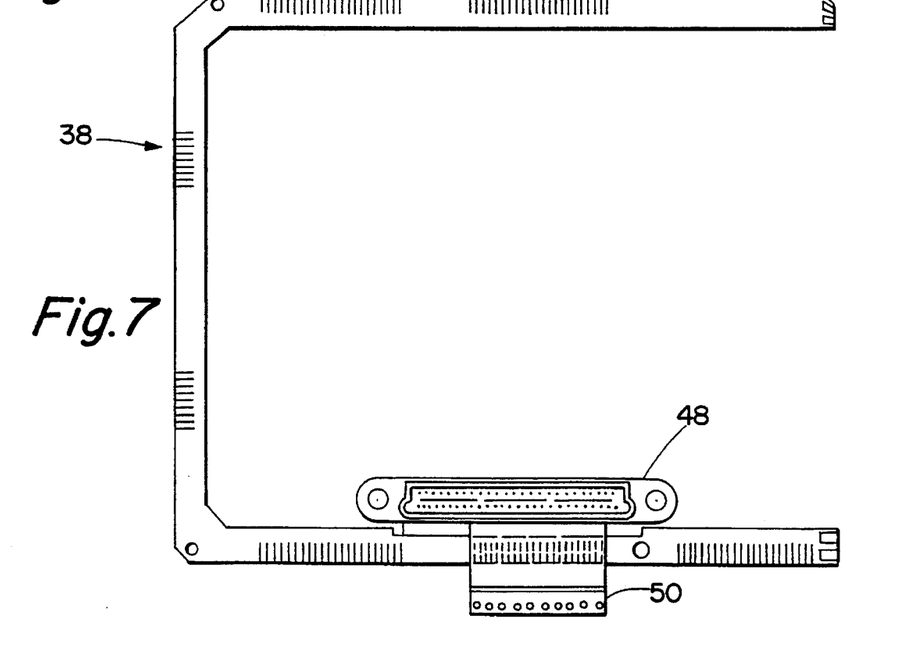
FIG. 7 is a plan view of a display interface device of the present invention.
Figure 8:
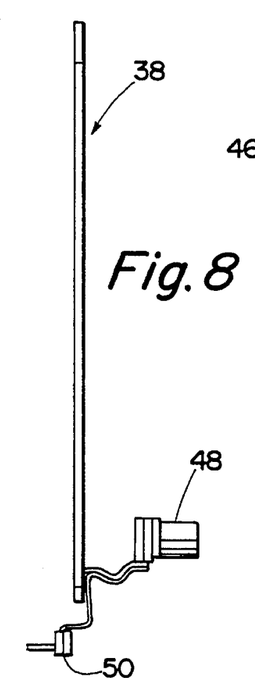
FIG. 8 is a cross sectional view of the display interface of FIG. 7.

FIGS. 7 and 8 are views of a display interface device (38) which substantially frames the liquid crystal display glass assembly. The interface device (38) includes a plurality of pin connections for receiving the electrical signals from the interface electronics within the chassis (30). In a preferred embodiment of the present invention the number of pin connections is 150 which is a dramatic reduction from known liquid crystal glass having over 1,000 such connections. The known glass made use of ribbon cable connections from the glass to the interface electronics. Ribbon cables take up much space and were one reason why such displays have not had their screen moved to the bezel portion of the assembly. To do this would have required that the ribbon cables extend to the bezel portion where there simply was not sufficient room to enlarge the viewing area of the display and maintain space for the ribbon cables as well. The display interface of the present invention has enabled the reduction of over 1,000 electrical connections to a more manageable number of 150. The display interface device of the present invention has also made it possible to eliminate the use of ribbon cable connections from the glass to the interface electronics. The display interface device (38) of the present invention is housed within a tray (40) which is shown in different views in FIGS. 9 and 10. The display interface (38) and the tray (40) may be designed to accommodate three tabs on the top edge (42) and three tabs on the bottom edge (44) of the tray (40) for driving the columns of liquid crystal dot transistors of the glass (32). Also there are two tabs on the right side of the tray (46) for driving the rows of the transistors.

Figure 9:
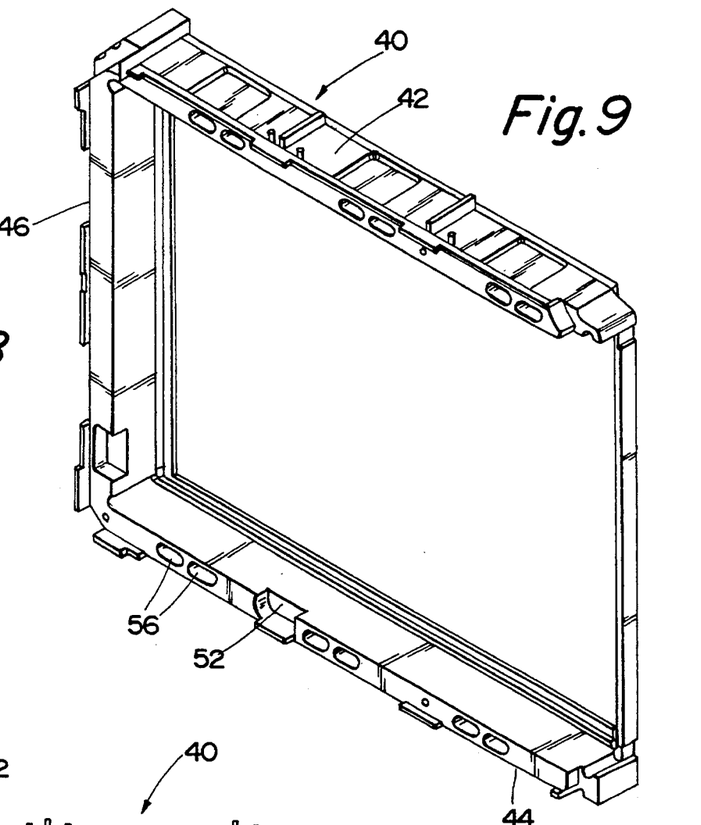
FIG. 9 is a perspective view of a tray of the present invention for housing the display interface of FIG. 7.
Figure 10:
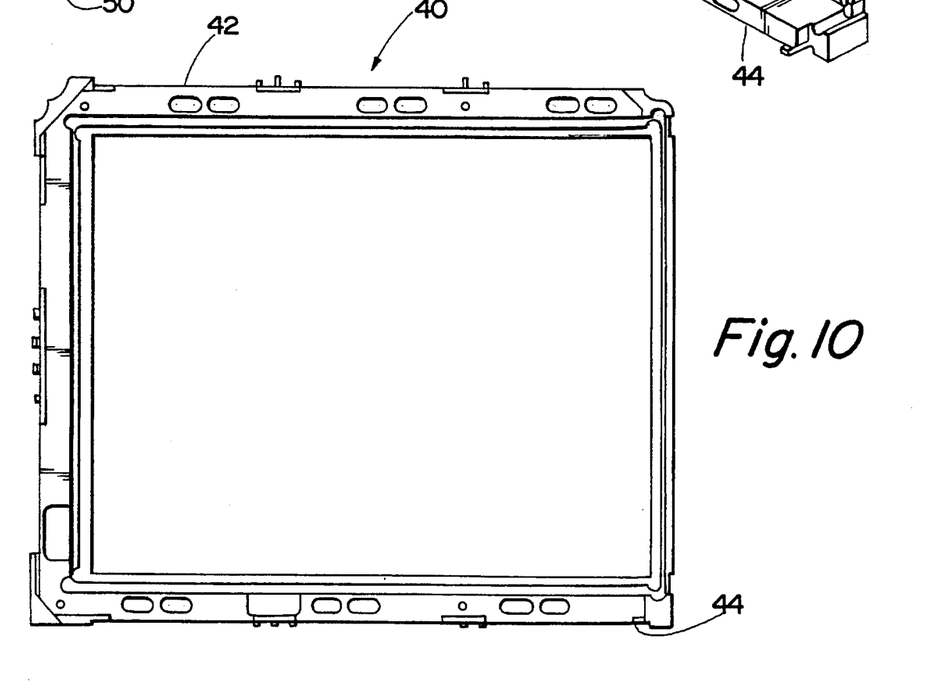
FIG. 10 is a plan view of the tray of FIG. 9.

The tray (40) of the present invention is preferably made of plastic and can be manufactured through an injection molding process or machined from stock. Other materials and manufacturing processes could also be used. Also forming a part of the display interface (38) is a first interconnect (48) which connects the display interface frame (38) to the display electronics found in the chassis (30). The first interconnect (48) may be a rigid flex rigid PCB/PWB. A second interconnect (50) may also be provided for handling input from the pilot through the bezel (24) to the display interface (38). The second interconnect (50) may be a pure flex circuit soldered to the first interconnect (48). Signals passed from the first and second interconnects (48, 50) to the tabs are received by the tabs through the connections (52) on the display interface (38). From the connections (52) the signals are ultimately delivered to the various rows and columns of liquid crystals on the glass (32). LCD row and column driver tabs are commercially available from Texas Instruments. The tabs may reside partially in slots (56) of tray (40).

It is thought that the advantages of the present invention will be apparent from the description of the drawings and preferred embodiments contained herein. It will be appreciated that after reading this specification those of skill in the art will arrive at various modifications to the invention described herein and these modifications are anticipated to fall within the scope of the present invention and the claims contained herein.

I claim:

1. An electronic flight indicator apparatus, said apparatus comprising:

a chassis adapted to be installed in a standard ARINC cutout of an aircraft instrument panel;

a mounting flange secured to said chassis;

a bezel secured to said mounting flange; and a display means having a signular viewing area on which information processed by said flight indicator is displayed, said singular viewing area being at least as large as the cross-sectional area of said chassis, said display means secured within said bezel.

2. The flight indicator of claim 1, wherein said apparatus is a horizontal situation indicator.

3. The flight indicator of claim 1, wherein said apparatus is an attitude direction indicator.

4. The flight indicator of claim 1, further comprising:

a backlight unit for illuminating said display means, said backlight unit secured to said bezel and located between said display means and said chassis.

5. The flight indicator of claim 1, wherein said display means includes a liquid crystal glass assembly.

6. The flight indicator of claim 1, wherein said display means comprises a viewing area of greater than 3.4 inches by 2.8 inches and less than 5 inches by 4 inches.

7. The flight indicator of claim 1, further comprising:

a display interface assembly including a plurality of electrical connections, a first interconnect for facilitating the electrical connection between said display interface assembly and instrument electronics within said chassis, and a second interconnect for facilitating the electrical connection between said display interface assembly and controls on said bezel, said display interface assembly adapted to be connected to said display means.

8. The display interface assembly of claim 7 further comprising:

a plurality of liquid crystal display driver tabs attached to said display interface assembly and electrically connected with said display means.

9. The flight indicator of claim 8, wherein certain of said tabs drive columns of red, green, and blue liquid crystal transistor switches and other of said tabs drive rows of said transistor switches.

* * * * *

UNITED STATES PATENT AND TRADEMARK OFFICE
CERTIFICATE OF CORRECTION

PATENT NO. : 5,467,085
DATED : November 14, 1995
INVENTOR(S) : William R. Dunn

It is certified that error appears in the above-identified patent and that said Letters Patent is hereby corrected as shown below:

Column 4, line 42, delete "signular" and replace it with --singular--.

Signed and Sealed this

Twenty-seventh Day of February, 1996

Attest:

BRUCE LEHMAN

*Attesting Officer*     *Commissioner of Patents and Trademarks*